(12) United States Patent  
Sakuraba

(10) Patent No.: US 8,311,234 B2  
(45) Date of Patent: Nov. 13, 2012

(54) ECHO CANCELLER AND COMMUNICATION AUDIO PROCESSING APPARATUS

(75) Inventor: Yohei Sakuraba, Kanagawa (JP)

(73) Assignee: Sony Corporation, Tokyo (JP)

( * ) Notice: Subject to any disclaimer, the term of this patent is extended or adjusted under 35 U.S.C. 154(b) by 1419 days.

(21) Appl. No.: 11/923,982

(22) Filed: Oct. 25, 2007

(65) Prior Publication Data

US 2008/0112568 A1 May 15, 2008

(30) Foreign Application Priority Data

Nov. 10, 2006 (JP) ............................... P2006-305793

(51) Int. Cl.
- *H04B 3/20* (2006.01)
- *H04M 9/08* (2006.01)
- *A61F 11/06* (2006.01)

(52) U.S. Cl. .................. 381/66; 381/71.12; 379/406.14

(58) Field of Classification Search .................... 381/66; 379/406.14

See application file for complete search history.

(56) References Cited

U.S. PATENT DOCUMENTS

| | | | |
|---|---|---|---|
| 6,198,819 B1 * | 3/2001 | Farrell et al. | 379/406.08 |
| 6,424,635 B1 * | 7/2002 | Song | 370/286 |
| 2003/0123674 A1 * | 7/2003 | Boland | 381/66 |

FOREIGN PATENT DOCUMENTS

| | | |
|---|---|---|
| JP | 9-6391 | 1/1997 |
| JP | 2003-101445 | 4/2003 |

OTHER PUBLICATIONS

Chen et al (Suppressing Acoustic Echo in a Spectral Envelope Space, IEE, 2005).*
Notification of Reasons for Refusal Dated Apr. 12, 2010, from the Japanese Patent Office in corresponding Japanese Patent Application No. 2007-27491.
Sakauchi Sumitaka et al., "Study of non-linear echo suppression processing based on a short time spectrum amplitude estimate", Acoustical Society of Japan 1998 Spring meeting for presenting research papers lecture memoirs I, pp. 551-552 (3-5-11), Mar. 17, 1998.

* cited by examiner

*Primary Examiner* — Matthew Landau
*Assistant Examiner* — Khaja Ahmad
(74) *Attorney, Agent, or Firm* — Finnegan, Henderson, Farabow, Garrett & Dunner, L.L.P.

(57) ABSTRACT

Disclosed herein is an echo canceller for use in a sound reinforcement communication system configured to carry out a sound reinforcement communication by utilizing a speaker and a microphone, the echo canceller including: an adaptive filter section configured to adaptively identify an impulse response of a feedback path formed by an acoustic coupling or the like between the speaker and the microphone to estimate an echo component in the feedback path from an input signal to the feedback path, and subtracting the echo component thus estimated from an output signal from the feedback path; and an echo suppressing section configured to execute echo suppressing processing for an output signal from the adaptive filter section.

5 Claims, 2 Drawing Sheets

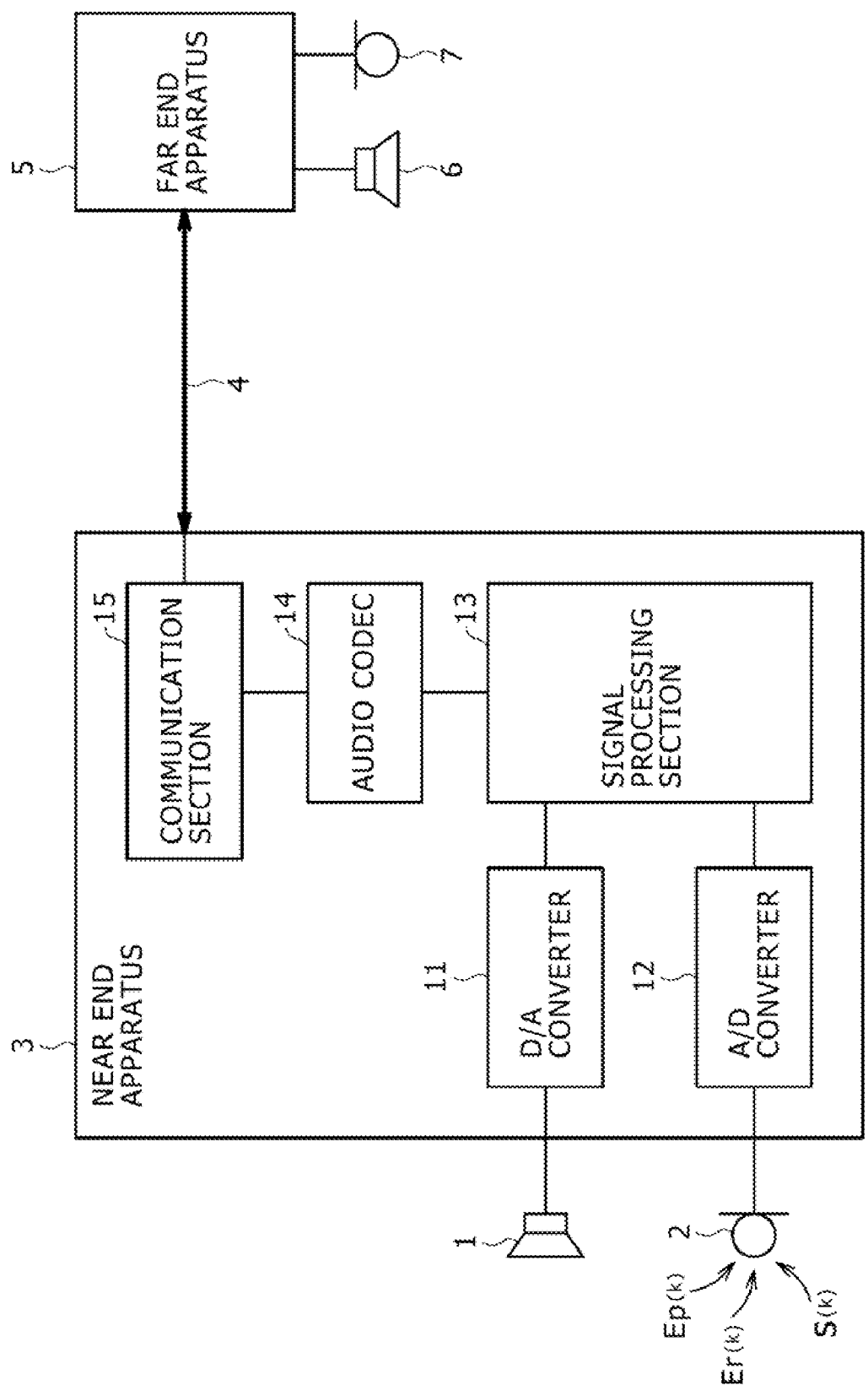

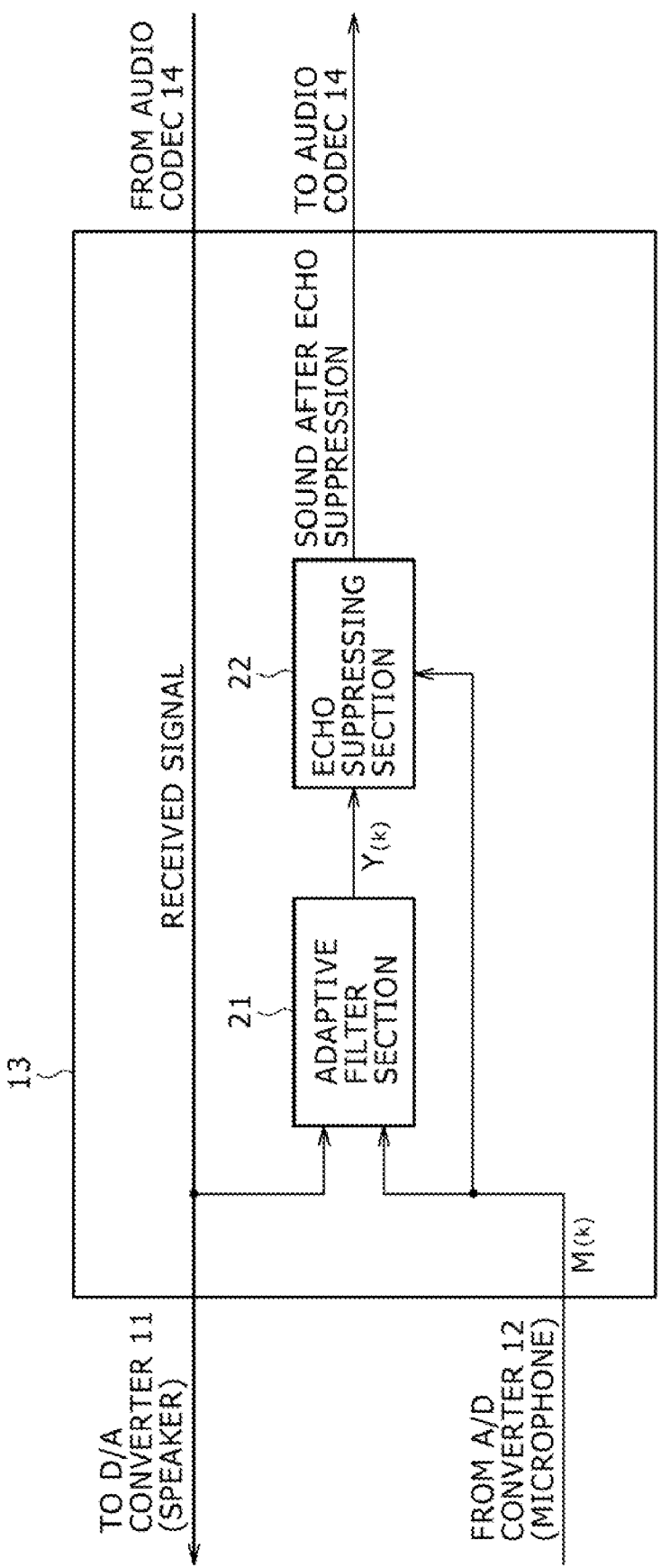

ECHO CANCELLER AND COMMUNICATION AUDIO PROCESSING APPARATUS

CROSS REFERENCES TO RELATED APPLICATIONS

The present invention contains subject matter related to Japanese Patent Application JP 2006-305793 filed in the Japan Patent Office on Nov. 10, 2006, the entire contents of which being incorporated herein by reference.

BACKGROUND OF THE INVENTION

1. Field of the Invention

The present invention relates to an echo canceller which is capable of solving a problem about an echo or a howling which is caused when a communication is made in a sound reinforcement communication system such as a hands free cellular phone system or a video conference system, and a communication audio processing apparatus using the same.

2. Description of the Related Art

Heretofore, in a sound reinforcement communication system such as a video conference system, a sound picked up by using a microphone of a far end apparatus is sent to a near end apparatus, and is then outputted from a speaker of the near end apparatus. The near end apparatus is also equipped with a microphone. Thus, the near end apparatus is constructed such that a voice given by a speaker of the near end apparatus is sent to the far end apparatus. For this reason, the voices which are outputted from the speakers on the far end side and the near end side are inputted to the microphones, respectively. When no processing is executed for such a voice, this voice is sent to the other party apparatus again. Thus, this situation causes a phenomenon called "an echo" in which a voice produced by a communication party himself/herself is heard from the speaker somewhat late as in an echo. When the echo (feedback component) becomes large, the echo is inputted to the microphone again, and makes a circuit of the system, thereby causing "a howling".

An echo canceller is known as a device for prevented the echo or howling as described above from being caused. In general, with the echo canceller, an impulse response of a feedback path (echo path) formed by an acoustic coupling or the like between the speaker and the microphone is measured by using an adaptive filter. The impulse response described above is superimposed on a received signal (reference signal) outputted from the speaker, thereby generating a pseudo-echo. Also, the echo or the howling is removed by subtracting the resulting pseudo-echo from an audio signal picked up by using the microphone.

The adaptive filter in related art is composed of a processor having a variable coefficient, and an algorithm in accordance with which a coefficient is determined at any time. That is to say, with the adaptive filter, the variable filter coefficient is adaptively updated in accordance with an algorithm for minimizing a square mean value of an output signal from a subtracter, for example, a least-mean-square (LMS) algorithm. As a result, an echo component (a feedback component of the received signal fed through the feedback path) of the feedback path is estimated. Also, the echo component estimated by the adaptive filter is subtracted from a transmission signal in the subtracter, thereby canceling only the echo component contained in the transmission signal. As a result, none of components, other than the echo component, which are sound-collected by using the microphone (a voice given from the communication party to the microphone, an ambient noise of the circumference, and the like) undergoes any of the losses.

However, the echo may not be perfectly erased by such an echo canceller, and thus the echo which is left after completion of the erasing is heard by a speaker. This echo is called "a residual echo". The suppression of this residual echo is desired to the carrying out of the sound reinforcement communication system such as the video conference system without feeling a sense of incompatibility. Thus, heretofore, a technique for suitably adjusting a gain of the residual echo depending on the circumstances by executing echo suppressing processing, thereby making the residual echo less noticeable is proposed as the technique for suppressing the echo as described above.

According to this technique, a revaluation amount $\epsilon$ is given by the following expression (1):

$$\epsilon = E[\{S(k) - G(k) \cdot Y(k)\}^2] \quad (1)$$

where Y(k) represents an echo cancellation output signal (residual signal) outputted from the echo canceller after execution of the echo removing processing, Er(k) represents a residual echo signal which is more than the echo canceller can remove in the adaptive processing, S(k) represent a transmission sound (disturbing signal) sound-collected by using a microphone, E[ ] means that a short-time mean is obtained, and k represents a frequency. In addition, a filter G(k) for minimizing the revaluation amount $\epsilon$ is obtained based on the above expression (1), so that the transmission sound is emphasized by suppressing the echo.

According to a Wiener Filtering method as one technique for estimating a short-time spectral amplitude (STSA), the filter G(k) for minimizing the revaluation amount $\epsilon$ expressed by the above expression (2) is given by the following expression (2):

$$G(k) = \frac{E[|S(k)|^2]}{E[|S(k)|^2] + E[|Er(k)|^2]} \quad (2)$$

Normally, this echo suppressing processing is utilized together with the adaptive filter in many cases.

This echo suppressing processing, for example, is described in a Non-Patent Document of Sumitaka Sakauchi, and Yoichi Haneda; "Study about Non-linear Echo Suppressing Processing Based on Short-Time Spectral Amplitude Estimation", Proceeding of the 1998 Spring Meeting of The ASJ, The Acoustical Society of Japan, Mar., 1998, pp. 551 to 552,

SUMMARY OF THE INVENTION

However, the filter G(k) expressed by the above expression (2) may not be directly, actually obtained. The reason for this is that it is difficult to separate and extract the residual echo signal Er(k) contained in the residual signal, and the disturbing signal S(k) because the residual echo signal Er(k) and the disturbing signal S(k) may not be normally, directly observed.

In the light of the foregoing, it is desirable to provide an echo canceller which is capable of suppressing a residual echo in a sound reinforcement communication system such as a hands free cellular phone system or a video conference system, and a communication audio processing apparatus using the same.

According to an embodiment of the present invention, there is provided an echo canceller for use in a sound reinforcement communication system for carrying out a sound reinforcement communication by utilizing a speaker and a microphone. The echo canceller including an adaptive filter section for adaptively identifying an impulse response of a feedback path formed by an acoustic coupling or the like between the speaker and the microphone to estimate an echo component in the feedback path from an input signal to the feedback path, and subtracting the echo component thus estimated from an output signal from the feedback path; and an echo suppressing section for executing echo suppressing processing for an output signal from the adaptive filter section. The echo suppressing section obtains an echo suppression amount based on Wiener Filtering by using an echo reduction amount defined based on a ratio of the output signal from the feedback path to a residual signal, and multiplies the output signal from the adaptive filter section by the echo suppression amount.

According to the embodiment having the above constitution of the present invention, the echo suppression amount based on the Wiener Filtering is calculated by using the echo reduction amount defined based on the ratio of the output signal from the feedback path to the residual signal. As a result, the suitable echo suppression amount can be obtained based on a simple computational expression.

In addition, according to another embodiment of the present invention, there is provided a communication audio processing apparatus for use in a sound reinforcement communication system for carrying out a sound reinforcement communication. The communication audio processing apparatus including: the speaker for outputting a received sound received from a far end side; and the microphone for receiving as its input a transmission sound. The speaker and the microphone are used for the sound reinforcement communication system configured to carry out the sound reinforcement communication. Further, the communication audio processing apparatus including: an echo canceller composed of an adaptive filter section for adaptively identifying an impulse response of a feedback path formed by an acoustic coupling or the like between the speaker and the microphone to estimate an echo component in the feedback path from an input signal to the feedback path, and subtracting the echo component thus estimated from an output signal from the feedback path; and an echo suppressing section for executing echo suppressing processing for an output signal from the adaptive filter section. The echo suppressing section of the echo canceller obtains an echo suppression amount based on Wiener Filtering by using an echo reduction amount defined based on a ratio of the output signal from the feedback path to a residual signal, and multiplies the output signal from the adaptive filter section by the echo suppression amount.

According to the embodiment having the above constitution of the present invention, the echo suppression amount based on the Wiener Filtering is calculated by using the echo reduction amount defined based on the ratio of the output signal from the feedback path to the residual signal. As a result, the suitable echo suppression amount can be obtained based on a simple computational expression. Consequently, it is possible to suitably suppress the residual echo which is more that the adaptive filter section can erase.

According to the embodiments of the present invention, in the echo canceller for use in the sound reinforcement communication system, the echo suppression amount is calculated by using the echo reduction amount defined based on the ratio of the output signal from the feedback path to the residual signal. Also, a gain of an output signal from the adaptive filter section is adjusted based on the echo suppression amount thus calculated. As a result, the residual echo can be suppressed.

In addition, the use of the sound reinforcement communication system including the echo canceller described above makes it possible to suitably suppress the residual echo, thereby making the residual echo less noticeable. As a result, for example, it is possible to solve the problem about the echo or the howling in the hands free cellular phone system, the video conference system or the like.

BRIEF DESCRIPTION OF THE DRAWINGS

FIG. 1 is a block diagram showing an entire configuration of a sound reinforcement communication system according to an embodiment of the present invention; and FIG. 2 is a block diagram showing a structure of a signal processing section shown in FIG. 1 and provided in a communication audio processing apparatus.

DETAILED DESCRIPTION OF THE PREFERRED EMBODIMENTS

Embodiments of the present invention will be described in detail hereinafter with reference to the accompanying drawings.

Firstly, an embodiment of a sound reinforcement communication system to which an echo canceller and a communication audio processing apparatus of the present invention are applied will now be described. FIG. 1 shows an entire configuration of a video conference system as an example of a bidirectional (full duplex) sound reinforcement communication system. In FIG. 1, any of sections such as sections about image processing which are unrelated to a description of the embodiment of the present invention are omitted here in its description for the sake of simplicity.

In the video conference system shown in FIG. 1, a near end apparatus 3 and a far end apparatus 5 are connected to each other through a communication line 4. Here, the near end apparatus 3 includes a speaker 1 for outputting a received audio, and a microphone 2 for receiving as its input a transmission audio. Likewise, the far end apparatus 5 includes a speaker 6 and a microphone 7. As a result, a full duplex communication can be bidirectionally made. The near end apparatus 3 and the far end apparatus 5 are communication audio processing apparatuses having the same functions. Thus, an illustration of an internal block of the far end apparatus 5 is omitted in FIG. 1 for the sake of simplicity.

The speaker 1 connected to the near end apparatus 3 outputs a sound which is obtained by suitably processing a sound sound-collected by using the microphone 7 connected to the far end apparatus 5 in the near end apparatus 3. The microphone 2 connected to the near end apparatus 3 sound-collects a statement audio from an attendance present in the video conference on the near end side. Also, the microphone 2 connected thereto sound-collects a sound as well which is output ted from the speaker 1 to be superimposed on the statement audio through the space.

A digital/analog (D/A) converter 11 converts digital audio data processed in a signal processing section 13 into analog audio data. The analog audio data obtained by processing the digital audio data in the signal processing section 13 is suitably amplified by an amplifier (not shown), and is then outputted from the speaker 1.

An analog/digital (A/D) converter 12 converts a sound (analog audio data) sound-collected by using the microphone 2 into digital audio data. At this time, a sound (analog audio data) which is suitably amplified by an amplifier (not shown) is inputted to the A/D converter 12.

The signal processing section 13, for example, is constituted by a digital signal processor (DSP), and executes processing for converting input and output audio data into desired data, respectively. This processing executed in the signal processing section 13 will be described in detail later.

An audio codec 14 converts audio data based on the microphone input and sent from the signal processing section 13 into codes which are determined in the communication made in the video conference system on the standard scale. Also, the audio codec 14 decodes encoded audio data which is sent from the far end apparatus 5 through the communication section 15, and sends the resulting audio data to the signal processing section 13.

The communication section 15 carries out transmission and reception of input/output data on encoded sound in the form of a digital communication with the far end apparatus 5 through the communication line 4. A general digital communication line such as Ethernet (registered trademark) is utilized in the communication line 4.

FIG. 2 is a block diagram showing an internal structure of the signal processing section 13. The signal processing section 13 functions as the echo canceller, and is composed of an adaptive filter section 21 and an echo suppressing section 22. Here, any of sections which are unrelated to the description of the embodiment of the present invention is omitted in FIG. 2 as well for the sake of simplicity.

The adaptive filter section 21 has an adaptive filter function, and an arithmetically operating function. Here, with the adaptive filter function, an impulse response of a feedback path (echo path) formed by an acoustic coupling or the like between the speaker and the microphone is adaptively identified, thereby estimating an echo component of the feedback path from an input signal (received signal) to the feedback path. Also, with the arithmetically operating function, the echo component estimated in an adaptive filter provided in the adaptive filter section 21 is subtracted from an output signal (microphone input signal) from the feedback path.

The adaptive filter described above is composed of a processor having a variable coefficient, and an algorithm in accordance with which the coefficient is determined at any time. That is to say, with the adaptive filter, the variable filter coefficient is adaptively updated in accordance with an algorithm for minimizing a square mean value of an output signal from a subtracter, for example, a least-mean-square (LMS) algorithm. As a result, an echo component (a feedback component of the received signal fed through the feedback path) of the feedback path is estimated. Also, the echo component estimated by the adaptive filter is subtracted from a transmission signal in the subtracter, thereby removing the echo component contained in the transmission signal. As a result, none of components, other than the echo component, which are sound-collected by using the microphone (a voice given from the communication, party to the microphone, an ambient noise of the circumference, and the like) undergoes any of the losses.

An audio signal (received signal) which is sent from the audio codec 14 to the signal processing section 13 is directly outputted from the speaker 1, and also sent to the adaptive filter section 21. In addition, an audio signal (microphone input signal) which is sent from the microphone 2 to the signal processing section 13 through the A/D converter 12 is supplied to the adaptive filter section 21. Also, an audio signal which is obtained by echo-canceling the above audio signal in the adaptive filter section 21 is sent to the echo suppressing section 22. The echo suppressing section 22 determines an echo suppression amount based on both the microphone input signal sent thereto from the A/D converter 12, and the audio signal which is obtained by executing the echo canceling processing for the previous audio signal in the adaptive filter section 21, and thus which is sent from the adaptive filter section 21. As a result, the audio signal for which the echo suppressing processing is executed is delivered from the signal processing section 13 to the audio codec 14.

A signal other than the audio signal originating from the echo functions as a disturbing signal under the circumstances that the noise and the transmission audio are sound-collected. As a result, the filter coefficient of the adaptive filter becomes unstable, so that the echo suppressing processing becomes imperfect. Hereinafter, a description will be given with respect to a method of estimating an echo suppression amount according to the present invention. In this embodiment of the present invention, an echo suppression amount based on the Wiener Filtering is obtained by using echo return loss enhancement (hereinafter referred to as "ERIE"). The ERLE represents how much echo the adaptive filter section 21 can remove in its adaptive processing (echo reduction amount).

The audio signal M(k) inputted to the microphone 2, and the echo-canceled output signal (residual signal.) Y(k) outputted from the adaptive filter section 21 are expressed by the following expressions (3) and (4), respectively:

$$M(k)=S(k)+Er(k)+Ep(k) \quad (3)$$

$$Y(k)=S(k)+Er(k) \quad (4)$$

where S(k) represents a disturbing signal inputted to the microphone 2, Ep(k) represents the echo signal estimated in the adaptive filter, Er(k) represents the residual echo signal which is more than the adaptive filter can erase in its adaptive processing, and k represents a frequency.

The echo reduction amount ERLE is an amount which is defined by using a ratio of amplitude of the microphone input signal M(k) to amplitude of the residual signal Y(k). Thus, the echo reduction amount ERLE is expressed by the following expression (5):

$$ERLE = 20\log\left(\frac{|M(k)|}{|Y(k)|}\right) \quad (5)$$

where a unit of the ERLE is [dB].

In this embodiment, a ratio of a square of a power of the residual signal Y(k) to a square of a power of the microphone input signal M(k) is defined as the echo reduction amount ERLE, and is expressed by the following expression (6):

$$ERLE = \frac{E[|S(k)|^2] + E[|Er(k)|^2]}{E[|S(k)|^2] + E[|Er(k)|^2] + E[|Ep(k)|^2]} \quad (6)$$

where E[ ] means that a short-time mean is obtained.

Hereinafter, when the descriptions of the short-time mean, the power and the square are omitted, and $E[|S(k)|^2]$, $E[|Er(k)|^2]$, and $E[|Ep(k)|^2]$ are simply expressed by S, Er and Ep, respectively, the expression (6) can be transformed info the following expression (7):

$$ERLE = \frac{S+Er}{S+Er+Ep} \quad (7)$$

An echo reduction amount which is calculated based on a power of a short-time mean of these signals will be referred hereinafter to as "a short-time ERLE". Also, an amount which is obtained by multiplying the short-time ERLE by a time constant to obtain a long-time mean will be referred hereinafter to as "a long-time ERLE". For example, when a measurement time is a long time of 10 second to some degree, there are many time zones in each of which no conversation is made. Thus, the disturbing signal S(k) becomes approximately zero on an average. In this case, it is thought that the long-time EREL approaches the following expression (8) because the influence of the disturbing signal S(k) is canceled:

$$\overline{ERLE} = \frac{Er}{Er + Ep} \qquad (8)$$

Here, the filter G(k) expressed by the expression (2) is transformed into expressions (9a) to (9e) by using the short-time EREL expressed by the expression (7), and the long-time EREL expressed by the expression (8):

$$G(k) = \frac{E[|S(k)|^2]}{E[|S(k)|^2] + E[|Er(k)|^2]} \qquad (9a)$$

$$= \frac{S}{S + Er} \qquad (9b)$$

$$= \frac{\frac{S}{S + Er + Ep} \cdot \frac{Ep}{Er + Ep}}{\frac{S + Er}{S + Er + Ep} \cdot \frac{Ep}{Er + Ep}} \qquad (9c)$$

$$= \frac{\frac{S + Er}{S + Er + Ep} - \frac{Er}{Er + Ep}}{\frac{S + Er}{S + Er + Ep} \cdot \left(1 - \frac{Er}{Er + Ep}\right)} \qquad (9d)$$

$$= \frac{ERLE - \overline{ERLE}}{ERLE \cdot (1 - \overline{ERLE})} \qquad (9e)$$

It is understood from the above that the filter G(k) for minimizing the revaluation amount ε based on the Wiener Filtering can be canceled by using both the short-time EREL and the long-time ERLE without directly obtaining both the disturbing signal S(k) and the residual echo signal Er(k). The echo suppressing section 22 suppresses the residual echo by using the filter G(k) obtained based on the above computational expressions (9a) to (9e), and sends the audio signal {G(k)·Y(k)} after completion of the echo suppression to the audio codec 14. In addition, the audio signal for which the echo suppressing processing is executed is sent from the near end apparatus 3 to the far end apparatus 5. Also, the sound for which the residual echo is suppressed is outputted from the speaker 6.

According to the embodiment described above of the present invention, the echo suppressing section 22 carries out the suppression of the residual echo based on the echo reduction amount ERLE as the post-processing of the echo canceling processing executed by the adaptive filter section 21. As a result, it is possible to suppress the residual echo which is more than the adaptive filter section 21 can erase in the echo canceling processing. Consequently, the problem about the echo is solved in the hands free cellular phone or in the video conference, and thus a user of the far end apparatus 5 can carry out the sound reinforcement communication for which the residual echo is suppressed without feeling a sense of incompatibility. Likewise, the far end apparatus 5 is also provided with the same function as that of the signal processing section 13 of the near end apparatus 3. As a result, a user of the near end apparatus 3 can carry out the sound reinforcement communication for which the residual echo is suppressed without feeling a sense of incompatibility.

Now, when the echo suppression by the above filter G(k) is carried out by being averaged over the entire frequency band of the voice band, the gain may be reduced over the entire voice band in the audio signal, after the echo suppression, outputted from the echo suppressing section 22. As a result, the sound volume of the sound outputted from the speaker 6 of the far end apparatus 5 may be reduced accordingly. In order to cope with such a situation, it is proposed as a change of the embodiment described above that the echo canceling processing is executed with the voice band of the microphone input signal being divided into parts, and the residual echo suppressing processing based on the echo reduction amount ERLE is executed every frequency band as the post-processing of the echo canceling processing.

For example, the frequency band [Hz] is divided so as to obtain a relationship of 0<k≦100, 100<k≦200, 200<k≦300, . . . , (where k is a frequency). Also, a filter coefficient is determined every frequency band in the adaptive filter within the adaptive filter section 21, and an echo component is obtained every frequency band. Thus, the echo canceling processing is executed. In addition, the echo suppressing section 22 carries out the suppression of the residual echo based on the echo reduction amount ERLE every frequency band for the echo-canceled output signal for each frequency band outputted from the adaptive filter section 21. Also, the echo suppressing section 22 sends the suppression result to the audio codec 14.

By carrying out the above operation, the suitable echo suppression can be carried out every frequency band for the microphone input signal. As a result, the suitable echo suppression can be carried out every frequency band instead of carrying out the uniform echo suppression over the entire frequency band. Consequently, the finely-tuned echo suppressing processing can be executed, and also it is possible to prevent the entire sound volume of the audio signal after suppression of the residual echo from being reduced.

Moreover, with regard to another change of the embodiment described above, in the communication audio processing apparatus which executes the echo canceling processing with the voice band being divided into parts, the residual echo suppression based on the echo reduction amount ERLE is carried out as the post-processing of the echo canceling processing for the frequency components each of which exerts a large influence on a sound quality. On the other hand, the frequency components each of which exerts a small influence on the sound quality are outputted to the communication audio processing apparatus on the other party side by using a voice switch or the like without executing any of the processing. Here, the voice switch is a switching section for switching execution of the echo suppressing processing and inexecution thereof over to each other. By adopting such a constitution, the sound reinforcement communication system can be designed in consideration of both the sound quality and a calculation amount.

Furthermore, still another change of the embodiment described above may also be made as follows. That is to say, the echo suppressing section 22 may execute the echo suppressing processing every frequency band with respect to the specific frequency component for the echo-canceled output signal outputted from the adaptive filter section 21. On the other hand, the echo suppressing section 22 may output the echo-canceled output signal having other frequency components to the audio codec 14 without executing any of the processing. As a result, the more finely-tuned echo suppressing processing can be executed.

It is noted that the present invention is not intended to be limited, to the embodiment described above. Thus, it is to be understood that various changes and modifications such as provision of the adaptive filter section 21 and the echo suppressing section 22 in an integrally structured processing section without departing from the gist of the present invention.

It should be understood by those skilled in the art that various modifications, combinations, sub-combinations and alterations may occur depending on designs and other factors insofar as they are within the scope of the appended claims or the equivalents thereof.

What is claimed is:

1. An echo canceller for use in a sound reinforcement communication system for carrying out a sound reinforcement communication by utilizing a speaker and a microphone, the echo canceller comprising:
an adaptive filter section for:
adaptively identifying an impulse response of a feedback path formed by an acoustic coupling between the speaker and the microphone;
estimating an echo component in the feedback path from an input signal to the feedback path, and
subtracting the echo component from an output signal from the feedback path; and
an echo suppressing section for executing echo suppressing processing of an output signal from the adaptive filter section; wherein the echo suppressing section:
obtains an echo suppression amount based on Wiener Filtering by using an echo reduction amount based on a ratio of the amplitude of the input signal to the amplitude of the output signal from the adaptive filter section and
multiplies the output signal from the adaptive filter section by the echo suppression amount
calculates the echo suppression amount G(k) using an echo reduction amount based on a power of a short-time mean (short-time ERLE) and an echo reduction amount based on a power of a long-time mean (long-time ERLE), wherein
G(k) ={(short-time ERLE)−(long-time ERLE)}/ [(short-time ERLE)·{1-(long-time ERLE)}]; and
minimizes a revaluation amount $\epsilon$, $\epsilon = E[\{S(k) - G(k) \cdot Y(k)\}2]$;

wherein:

$G(k) = E[|S(k)|2]/\{E[|S(k)|2] + E[|Er(k)|2]\}$;

S(k) is a disturbing signal mixed into the feedback path;
Y(k) is the echo-canceled output signal (residual signal) outputted from the echo canceller after execution of the echo suppressing processing;
Er(k) is a residual echo signal contained in the residual signal;
E[] represents a short-time mean of the expression within the brackets; and
k is a frequency.

2. The echo canceller according to claim 1, wherein:
the short -time ERLE is expressed by:

(short-time ERLE) =$\{E[|S(k)|2]+E[|Er(k)|2]\}/\{E[|S(k)|2]+E[|Er(k)|2]+E[|Ep(k)|2]\}$ wherein Ep(k) is an echo signal estimated by the adaptive filter section; and
the long-time ERLE is expressed by:

(long-time ERLE) =$\{E[|Er(k)|2]\}/\{E[|Er(k)|2]+E[|Ep(k)|2]\}$.

3. The echo canceller according to any one of claims 1 to 2, wherein
the input signal is divided into frequency bands;
the adaptive filter section determines a filter coefficient and an echo component for every frequency band; and
the echo suppressing section executes echo suppressing processing for every frequency band of the output signal from the adaptive filter section.

4. The echo canceller according to claim 3, wherein the echo suppressing section:
executes echo suppressing processing for specific frequency components of the output signal from the adaptive filter section; and
outputs an output signal having frequency components with echo suppressing processing.

5. The echo canceller according to claim 3, wherein the echo suppressing section:
executes echo suppressing processing for every frequency band having a specific frequency components of the output signal from the adaptive filter section: and
outputs an output signal having frequency components with echo suppressing processing and other frequency components without executing processing.

* * * * *